United States Patent
Waern et al.

(10) Patent No.: US 12,009,581 B2
(45) Date of Patent: Jun. 11, 2024

(54) ANTENNA DEVICE FOR EMITTING AND RECEIVING ELECTROMAGNETIC WAVES

(71) Applicant: Alps Alpine Co., Ltd., Tokyo (JP)

(72) Inventors: Marten Waern, Gothenburg (SE); Martin Carlsson, Gothenburg (SE)

(73) Assignee: Alps Alpine Co., Ltd., Tokyo (JP)

( * ) Notice: Subject to any disclaimer, the term of this patent is extended or adjusted under 35 U.S.C. 154(b) by 216 days.

(21) Appl. No.: 17/859,711

(22) Filed: Jul. 7, 2022

(65) Prior Publication Data
US 2022/0344812 A1    Oct. 27, 2022

Related U.S. Application Data

(63) Continuation of application No. PCT/IB2021/050663, filed on Jan. 28, 2021.

(30) Foreign Application Priority Data

Jan. 30, 2020   (EP) .................................... 20154703

(51) Int. Cl.
*H01Q 1/32*      (2006.01)
*G01S 13/931*    (2020.01)
(Continued)

(52) U.S. Cl.
CPC ......... *H01Q 1/3241* (2013.01); *H01Q 1/3283* (2013.01); *H01Q 15/16* (2013.01); *H01Q 19/132* (2013.01); *G01S 2013/93275* (2020.01)

(58) Field of Classification Search
CPC .. H01Q 1/3233; H01Q 1/3241; H01Q 1/3283; H01Q 15/16; H01Q 15/18;
(Continued)

(56) References Cited

U.S. PATENT DOCUMENTS

| 2,480,199 A | 8/1949 | Rosenberg et al. |
| 3,029,431 A | 4/1962 | Miller |
| (Continued) | | |

FOREIGN PATENT DOCUMENTS

JP       2010-154182        7/2010

OTHER PUBLICATIONS

International Search Report from International Application No. PCT/IB2021/050663 dated Apr. 16, 2021.

*Primary Examiner* — Robert Karacsony
(74) *Attorney, Agent, or Firm* — Beyer Law Group LLP (57) ABSTRACT

An antenna device (100) includes an antenna element (102) for emitting and receiving electromagnetic waves, a reflector (104) for reflecting the electromagnetic waves emitted from the antenna element (102), and a substrate (106) on which the antenna element (102) and the reflector (104) are positioned. The substrate (106) defines a main extension plane (108) extending along a horizontal direction (Y) and a lateral direction (X), wherein a vertical direction (Z) extends perpendicular to the horizontal direction (Y) and the lateral direction (X), and thus perpendicular to the main extension plane (108). The reflector (104) has a concave shape (112) in the vertical direction (Z) thereby spatially narrowing in the vertical direction (Z) the electromagnetic waves emitted by the antenna element (102), and has a convex shape (110) in the horizontal direction (Y) thereby spatially widening in the horizontal direction (Y) the electromagnetic waves emitted by the antenna element (102).

17 Claims, 4 Drawing Sheets

(51) Int. Cl.
*H01Q 15/16* (2006.01)
*H01Q 19/13* (2006.01)

(58) Field of Classification Search
CPC ........ H01Q 15/20; H01Q 15/23; H01Q 19/10; H01Q 19/102; H01Q 19/12; H01Q 19/132; H01Q 19/17; H01Q 19/175; H01Q 19/18; G01S 13/56; G01S 2013/93275

See application file for complete search history.

(56) References Cited

U.S. PATENT DOCUMENTS

| | | |
|---|---|---|
| 6,091,363 A | 7/2000 | Komatsu et al. |
| 2005/0285736 A1 | 12/2005 | Hofbeck et al. |
| 2006/0092076 A1 | 5/2006 | Franson et al. |
| 2018/0170309 A1 | 6/2018 | McMahon et al. |
| 2020/0355814 A1* | 11/2020 | Tsai ........................ H01Q 19/17 |

* cited by examiner

ANTENNA DEVICE FOR EMITTING AND RECEIVING ELECTROMAGNETIC WAVES

CLAIM OF PRIORITY

This application is a Continuation of International Application No. PCT/IB2021/050663 filed on Jan. 28, 2021, which claims benefit of European Patent Application No. 20154703.1 filed on Jan. 30, 2020. The entire contents of each application noted above are hereby incorporated by reference.

BACKGROUND OF THE INVENTION

1. Field of the Invention

The present invention is directed to an antenna device for emitting and receiving electromagnetic waves, an automotive sensor for detecting a movement of an object, a vehicle with a sensor for detecting a movement of an object and a method for detecting a movement of an object relative to a sensor.

2. Description of the Related Art

Emitting electromagnetic waves from a radar antenna and reflecting them towards an object and additionally receiving the reflected electromagnetic waves with the same radar antenna is a common problem. Therefore, a variety of different reflectors and horn antennas exist, but specific applications of antenna devices require defined particular conditions for the antenna device. Moreover, in the automotive field the need for reliable and sensitive sensors for detecting movements of objects outside or inside the vehicle relative to the vehicle has increased in the recent years.

It is in this context that the inventors of the present invention have identified the need for an improved antenna device and an improved automotive sensor, as will be explained in detail hereinafter.

SUMMARY OF THE INVENTION

With the embodiments of the invention, an improved antenna device for emitting and receiving electromagnetic waves is provided.

The present invention is defined by the independent claims. Further embodiments and advantages of the present invention are incorporated in the dependent claims and the description.

Technical terms are used in their common sense. If a specific meaning is conveyed to certain terms, a definition of terms will be given in the following in which the terms are used.

According to a first aspect of the invention, an antenna device comprises an antenna element configured for emitting and receiving electromagnetic waves. Furthermore, the antenna device comprises a reflector configured for reflecting the electromagnetic waves emitted from the antenna element. In addition, the antenna device comprises a substrate on which the antenna element and the reflector are positioned. Furthermore, the substrate has a main extension plane extending along a horizontal direction and a lateral direction. This means that the substrate has a surface, which defines a main extension plane extending along the horizontal direction and a lateral direction. In other words, the substrate defines a main extension plane extending along the horizontal direction and the lateral direction, within which a surface of the substrate is located/arranged. In addition, a vertical direction extends perpendicular to the horizontal direction and the lateral direction and thus perpendicular to the main extension plane of the substrate. Furthermore, the reflector is configured for spatially narrowing in the vertical direction the electromagnetic waves emitted by the antenna element.

In addition, the reflector is configured for spatially widening in the horizontal direction electromagnetic waves emitted by the antenna element.

The advantage of this aspect is that, with the specific geometry or form of the reflector, the electromagnetic waves, which are emitted by the antenna element, are reflected by the reflector in a narrower but at the same time wider corridor. Thus, the reflector allows an improved adjustment/adaptation of the corridor through which the emitted electromagnetic waves are spread by narrowing the spread of the electromagnetic waves in one direction and simultaneously widening the spread of the electromagnetic waves in another direction.

Thereby, a more accurate detection of objects can be achieved with the reflector. This is in particular helpful when the antenna device is used for an automotive sensor for detecting a movement in a specific corridor relative to the vehicle, because the spatial narrowing of the reflector and the spatial widening in the horizontal direction can be adjusted to the specific corridor in relation to the vehicle, which should be supervised. Therefore, the detection accuracy can be increased. Furthermore, it can be beneficial that the reflector can be mounted by soldering to the substrate of the antenna device, thereby reducing external noise, which may result from a potential gap between the reflector and the substrate. In other words, it may be beneficial that no gap exists between the reflector and the substrate of the antenna device to reduce external noise. Alternatively, or additionally, the reflector may be attached to the substrate of the antenna device by another adhesive bond, such as welding, bonding and the like.

In other words, the antenna device comprises an antenna element, which is configured for emitting, sending and/or generating and receiving and/or being subjected to electromagnetic waves or radar. Furthermore, the antenna device can comprise a reflector for reflecting and/or deflecting the electromagnetic waves emitted from the antenna element. The antenna element can be any element, which is configured for outputting radar waves and/or electromagnetic waves. In the following, the terms "electromagnetic waves", "radar waves", "radar signals" and "radar" are used synonymously. In particular, the reflector can be any element configured for reflecting and/or deflecting electromagnetic waves emitted from the antenna element towards an object. Furthermore, the antenna device can comprise a substrate on which the antenna element and the reflector are positioned, located to each other and/or orientated to each other. The substrate can be, for example a PCB or a flexible PCB.

Figure 2:
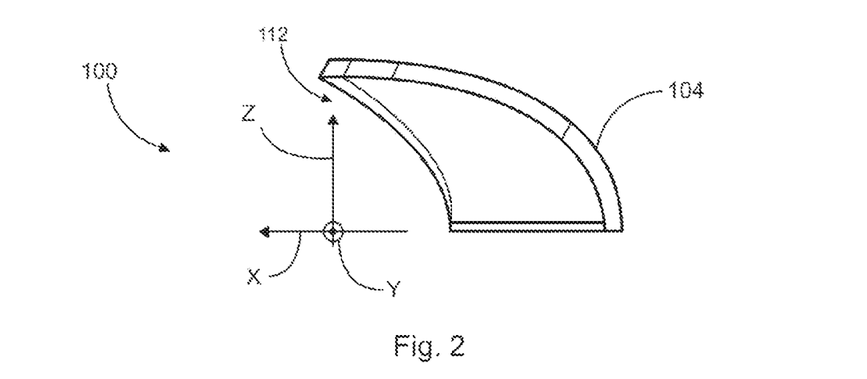
FIG. 2 shows a reflector according to an embodiment of the present invention.

Furthermore, the substrate can have, comprise and/or contain a main extension plane, in particular a plane of the major dimensions extending, respectively, being orientated along a horizontal direction and a lateral direction. Furthermore, the vertical direction can extend perpendicular to the horizontal direction and to the lateral direction, and thus perpendicular to the main extension plane of the substrate. These directions used in the context of the present invention are shown in FIG. 2.

In an example, the substrate has the dimensions of 100 mm×100 mm×3 mm. Therefore, the main extension plane may be defined by the two exemplary lengths of 100 mm of the substrate, thereby forming the horizontal and the lateral direction. Perpendicular to the horizontal and lateral direction, the vertical direction is orientated which is perpendicular to the main extension plane.

Furthermore, the reflector is configured for spatially narrowing, reducing and/or constricting, in the vertical direction, the electromagnetic waves emitted by the antenna element.

Furthermore, the reflector is configured for spatially widening, splaying and/or spatially extending, in the horizontal direction, the electromagnetic waves by the antenna element.

In an example of this embodiment, the reflector is a molded part, which is connected to the substrate on which the antenna element is located. Preferably, the reflector is attached to the substrate, on which the antenna element is located. The antenna element can then emit electromagnetic waves, which are reflected by the reflector towards an object. In case the electromagnetic waves hit the object, they are reflected back to the reflector. Furthermore, the antenna element is configured for receiving the electromagnetic waves, which have been reflected by the object, via the reflector. The orientation of the reflector and the positioning of the reflector in relation to the substrate and the antenna element can be gathered in more detail from FIGS. 1 and 2 and the corresponding part of the figure description.

According to an embodiment, the reflector and the antenna element are positioned at the same plane of the substrate.

The advantage of this embodiment can be that the external noise can be reduced, since no gap is located between the reflector and the substrate, therefore, increasing the accuracy of detection of the antenna device. In other words, the reflector and the antenna are positioned and/or located in the same plane of the substrate and/or on the same surface of the substrate. For example, the reflector and the antenna element can be both located on the same plane, in particular having no offset to each other. One can also say that the reflector and the antenna are both attached to the same plane of the substrate and/or to the same surface of the substrate, in particular having no offset to each other regarding said plane and/or surface. This embodiment can also easily be gathered from the detailed embodiments shown in e.g. FIGS. 1 and 4.

A second aspect of the invention is an automotive sensor for detecting a movement of an object, for example, of a user of a vehicle. The sensor comprises an antenna device as described before and hereinafter. Furthermore, the automotive sensor comprises a detection unit. The detection unit is configured for detecting a movement of the object based on electromagnetic waves emitted and received by the antenna element.

The advantage of this aspect is that with the help of the antenna device and the detection unit a specific corridor or field of view can be supervised by the automotive sensor regarding a movement or motion of an object, thereby enabling a plurality of possibilities for further actions. This may be achieved with the specific geometry or form of the reflector, which reflects the electromagnetic waves in a narrower but at the same time wider corridor. Thus, the reflector allows an improved adjustment/adaptation of the corridor through which the emitted electromagnetic waves are spread by narrowing the spread of the electromagnetic waves in one direction and simultaneously widening the spread of the electromagnetic waves in another direction. Thereby, a more accurate detection of objects can be achieved with the reflector. This is in particular helpful when the antenna device is used for an automotive sensor for detecting a movement in a specific corridor relative to the vehicle because the spatial narrowing of the reflector and the spatial widening in the horizontal direction can be adjusted to the specific corridor in relation to the vehicle, which should be supervised.

In other words, the automotive sensor can be configured for detecting a movement and/or a location of an object with the help of a detection unit, which can be configured for detecting and/or recognizing a movement, respectively a motion of the object based on electromagnetic waves emitted and/or generated and received by the antenna element.

According to an embodiment, the reflector has a convex shape in the horizontal direction, preferably an at least partially U-shape in the horizontal direction. Furthermore, the convex shape causes the spatially widening, in the horizontal direction, of the electromagnetic waves emitted by the antenna element upon reflection at the reflector.

This embodiment can have the advantage that the electromagnetic waves emitted by the antenna element are more widened, respectively more spread along the horizontal direction, and therefore, a wider or respectively broader corridor can be supervised by the automotive sensor.

In other words, the reflector has and/or comprises a convex shape. In particular, a cross-section of the reflector along the lateral and horizontal direction comprises the convex shape of the reflector. In other words, the cross section of the reflector has a convex when seen in the vertical direction. This may lead to a U-shape along the horizontal direction. Furthermore, the convex shape causes, generates and/or leads to a spatially widening and/or spreading in the horizontal direction of the electromagnetic waves emitted by the antenna element upon reflection at the reflector. This embodiment is explained in more detail hereinafter, especially in view of FIGS. 2 and 3 and their corresponding description.

According to an embodiment, the reflector has a concave shape in the vertical direction. Furthermore, the concave shape causes the spatially narrowing, in the vertical direction, of the electromagnetic waves emitted by the antenna element upon reflection at the reflector.

This embodiment can have the advantage that with the help of the concave shape, the field of view, which is supervised by the antenna element with the help of the electromagnetic waves, is narrower, and therefore, the rate of detection failures can be reduced.

In other words, the reflector has a concave shape in the vertical direction, in particular a parabolic shape in the vertical direction. In particular, in the cross-section of the reflector along the lateral and the vertical direction, the reflector has a concave shape. In other words, the cross section of the reflector has a concave shape when seen in the horizontal direction. The concave shape causes, generates and/or leads to the spatial narrowing and/or focusing, in the vertical direction, of the electromagnetic waves emitted by the antenna element upon reflection at the reflector. In addition, the concave shape of the reflector may extend over the antenna element.

According to an embodiment, the concave shape of the reflector has an imaginary focal point, which is located towards the antenna element. Furthermore, the reflector due to convex shape in the horizontal direction bends away from the antenna element in the horizontal direction.

This embodiment can have the advantage that electromagnetic waves, which have been reflected by an object, are focused towards the antenna element, thereby increasing the yield of the reflected electromagnetic waves.

In other words, the concave shape of the reflector has, respectively comprises, an imaginary focal spot and/or a main focus which is located, respectively orientated, towards the antenna element. Furthermore, the reflector comprises and/or due to the convex shape in the horizontal direction bends away and/or forms a structure bent away from the antenna element in horizontal direction. In other words, the reflector comprises and/or forms a structure bent away from the antenna element in the horizontal direction and/or bends away from the antenna element in the horizontal direction due to the convex shape in the horizontal direction.

According to an exemplary embodiment, in the antenna device, the reflector has a parabolic shape in the vertical direction (Z) with a focal length that is selected from the range of 3 mm to 10 mm. Thus, in a preferred embodiment, the parabolic shape of the reflector, i.e. the parabola, has a focal length of 3 mm to 10 mm, in another preferred embodiment, it has a focal length of 3 mm to 8 mm, and in another preferred embodiment, it has a focal length of 3 mm to 5 mm. This shall be understood to include the focal lengths of the values that define the previously mentioned ranges, thus the focal length of the parabolic shape can also be 3 mm, 5 mm, 8 mm or 10 mm.

It should be noted that in the context of the present disclosure the term "parabolic shape" or "parabola" shall be understood that the reflector extends in the vertical direction (Z) along one side of the symmetry line of the corresponding full parabola, which is commonly used be the person skilled in the art. Thus, the reflector has a curvature in the vertical direction (Z) which is the same as one side of the symmetry line of the corresponding full parabola. An embodiment of a reflector with such a parabolic shape is shown in FIG. 2.

According to an exemplary embodiment, in the antenna device the reflector has a U-shape in the horizontal direction (Y), wherein the U-shape has a radius, which is selected from the range of 1 mm to 10 mm. In another preferred embodiment it has a radius of 3 mm to 8 mm, and in another preferred embodiment it has a radius of 4 mm to 6 mm. This shall be understood to include the radius values that define the previously mentioned ranges, thus the radius of the U shape in horizontal direction can also be 1 mm, 3 mm, 4 mm, 8 mm or 10 mm.

Figure 1:
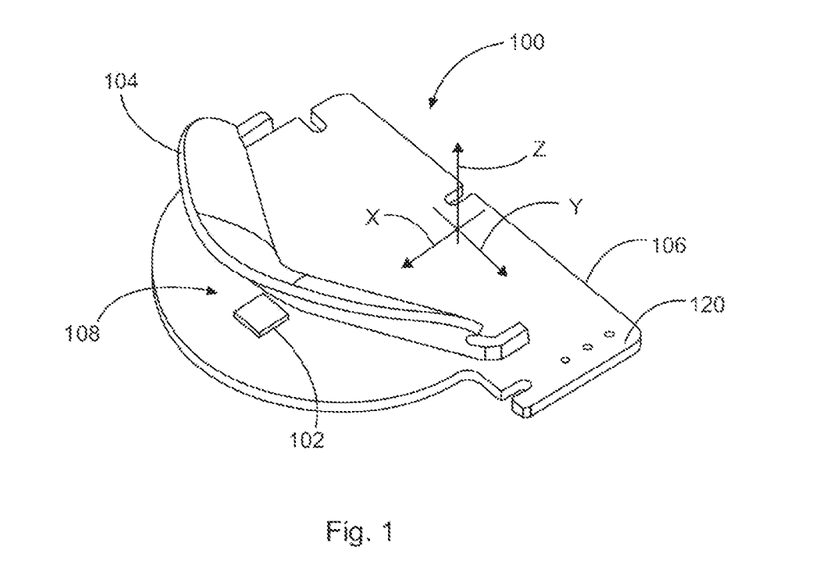
FIG. 1 shows an antenna device according to an embodiment of the present invention.
Figure 3:
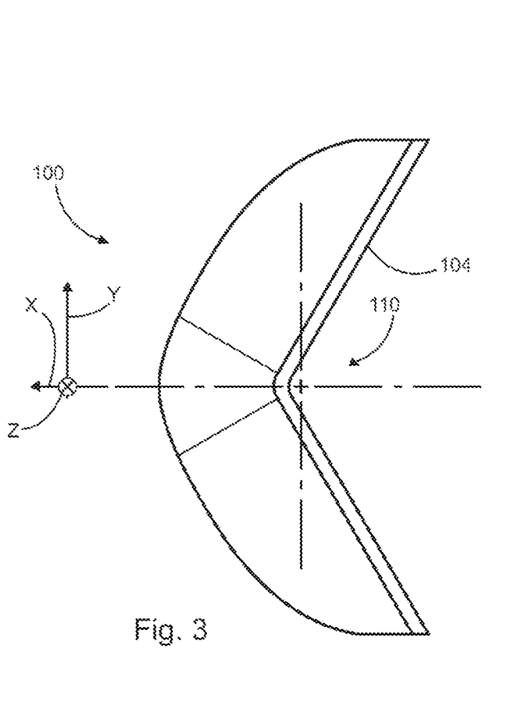
FIG. 3 shows a reflector according to an embodiment of the present invention.

In other words, the U-shape of the reflector can be defined by a radius, which is between 1 mm and 10 mm and/or an opening angle of the convex shape between 0° and 90°. Said opening angle shall be understood in the context of the present disclosure as the angle between the X-axis as shown in FIG. 3 and the surface at the backside of the reflector, the backside being the side of the reflector that faces away from the antenna element as, e.g.

shown in FIG. 1 with sign 102. Thus, in case, the opening angle would be 0°, the upper and lower part of the surface of the backside of the reflector shown in FIG. 3 above and below the X-axis would be closed, i.e. would be adjacently aligned. In case, the opening angle would be 90°, the back surface of the reflector would be a straight plane. This is why the values 0° and 90° are not part of this embodiment.

According to an embodiment of the invention, a ratio between the concave shape and the convex shape is in between 1:2 and 1:3. This can lead to the advantage that the ratio between the narrowing and the widening can be more effective and therefore, the yield of the reflected electromagnetic waves can be improved.

According to an embodiment, the antenna element is configured for emitting radar signals. Furthermore, the antenna element is configured for receiving radar signals reflected from the object to the sensor. This embodiment can have the advantage that the number of elements is reduced, since the antenna element comprises both functions, emitting and receiving radar signals.

In other words, the antenna element is configured for emitting, respectively outputting radar signals, respectively electromagnetic waves. Furthermore, the antenna element can be configured for receiving radar signals reflected from the object via the reflector. In other words, the antenna element emits electromagnetic waves towards the reflector, which then orientates the electromagnetic waves to the direction of an object. The object reflects the electromagnetic waves back to the antenna element via the reflector. Furthermore, the antenna element can then detect the object.

According to an embodiment, the sensor further comprises a transmission circuit and a reception circuit. Furthermore, the transmission circuit is configured for outputting a transmission signal towards the antenna element. In addition, the reception circuit is configured for detecting based on the electromagnetic waves reflected at the reflector and received by the antenna element a movement of the object relative to the sensor.

This embodiment can have the advantage that, with the transmission and the reception circuit, a movement of an object can be detected, in particular a movement in the field of view of the sensor.

According to an embodiment, the transmission circuit and the reception circuit are formed in one piece by an integrated circuit. Furthermore, the antenna element and the integrated circuit are preferably formed in one piece.

This embodiment can have the advantage that the space required for the sensor can be further reduced, since all components can be formed in one piece, respectively a mono block.

According to an embodiment, the antenna element comprises an emitting antenna and a receiving antenna. The emitting antenna is configured for emitting electromagnetic waves, e.g. radio waves. Furthermore, the receiving antenna is configured for receiving electromagnetic waves reflected at the object and reflected at the reflector, e.g. radio waves. In addition, the emitting antenna and the receiving antenna are preferably located side by side to each other on a substrate of the sensor.

This embodiment can have the advantage that the required space is further reduced, since the emitting and receiving antennas are located side by side which requires less space.

In other words, the emitting antenna and the receiving antenna are located both on the same substrate, in particular on the same surface of the substrate side by side. Side by side can mean in this context that the emitting antenna and the receiving antenna are located next to each other, in particular adjacent to each other.

According to a further aspect of the invention, a vehicle with a sensor for detecting a movement of an object is provided. The vehicle comprises a sensor as described before and hereinafter.

The advantage of this aspect is that a vehicle comprising the sensor as described before and hereinafter is more user friendly since the specific geometry respectively form of the reflector leads to a decrease of misdetection and misinterpretations of motions, which might trigger functions of the vehicle, which are not needed by the user. In particular, the automotive sensor for detecting a movement in a specific corridor relative to the vehicle can be very helpful because the spatial narrowing of the reflector and the spatial widening in the horizontal direction can be adjusted to the specific corridor in relation to the vehicle, which should be supervised. Therefore, the detection accuracy can be increased.

According to an embodiment, the sensor is attached to the vehicle below a trunk of the vehicle, e.g. at a bumper of the vehicle. Furthermore, the sensor is embodied as a kick sensor and is configured for detecting a movement of a user for opening a lid of the trunk of the vehicle.

This embodiment can have the advantage that the usability of the vehicle for a user is improved, since the movement of a user of the vehicle can be detected more precisely thanks to the specific form of the reflector.

In other words, the sensor is attached and/or positioned next to a trunk of a vehicle, in particular at a bumper of the vehicle. Furthermore, the sensor can be embodied as a kick sensor and can be configured for detecting a movement of a user, which can indicate/initiate an opening, and/or a closing of a lid of the frunk of the vehicle. For example, the user can approach the trunk of a vehicle and move his feet under the kick sensor, thereby starting the opening procedure of the lid of the trunk. In another scenario, the lid of the trunk is already opened and by triggering the kick sensor, the lid of the frunk closes automatically.

According to an embodiment, the sensor is configured for surveying an opening movement of a lid of the vehicle. In addition, the sensor is configured for detecting if the lid undergoing the opening movement is approaching an object like e.g. a carriage ceiling or a wall.

This embodiment can have the advantage that the usability of the vehicle is further improved, since the user of the vehicle is further unburdened.

In other words, the sensor can be configured for surveying and/or observing an opening, respectively closing, movement of a lid of the vehicle, in particular for prevention of automatic tail gate collision. The sensor can be configured for detecting and/or supervising if the lid undergoing, respectively performing, the opening and/or closing movement, approaches and/or comes close to an object. The object can be any object close to the lid of the frunk, for example like a carriage ceiling, a wall or a pole. Furthermore, any object between the lid and the sensor can be detected with the help of the sensor device, thereby improving the closing movement of the lid.

According to an embodiment, the sensor is attached to an interior part of the vehicle and configured for detecting a movement of a user inside the vehicle.

This embodiment can have the advantage that by placing the sensor inside the vehicle a further input channel for the user of the vehicle is provided, thereby improving the usability of the vehicle.

In other words, the sensor can be located inside the vehicle such that a movement, in particular a gesture of a user inside the vehicle can be detected and identified. Another positive effect can be, for example that with the help of the sensor, movements can be detected from persons outside of the car in combination with a burglar protection system.

According to an embodiment, the sensor is configured for detecting objects inside the vehicle. In such an embodiment, a processor or calculation unit of the sensor can then determine if it's a person or object. In other words, the processor/calculation unit can be configured to distinguish between persons and objects that are detected by the sensor to be inside the vehicle. Thus, in this embodiment, it is important to note that both, users and objects can be detected.

Moreover, when the sensor presented herein detects motions inside the vehicle, this detection can be used for several use cases, such as e.g. child presence detection, burglar alarm and seat belt reminder. Thus, the sensor can be configured in this embodiment to generate an alarm signal indicative for the detection of a burglar, wherein the signal is generated after the sensor has detected a burglar event. In another embodiment, the sensor can be configured to generate an alarm signal for reminding the user to close the seat belt, wherein the signal is generated after the sensor has detected the presence of a person inside the vehicle and in case the seat belt is not yet closed.

Detecting users and objects inside the vehicle is one use case, the other use case is to detect movements outside the vehicle. Thus, according to another exemplary embodiment, the sensor is placed around the vehicle/car to cover an outside range.

In an embodiment, that sensor is located in the door handle, preferably behind a protection element like, for example behind a plastic cover. In this way, the sensor will detect if there is a person moving outside of the vehicle with potential intention to break in or similar.

According to another exemplary embodiment, the sensor is configured to generate an alarm signal or control signal when it has detected an object and/or a person. In a preferred embodiment, car lamps could be turned on and/or an interior camera can be started to record by a control signal generated by the sensor.

A further aspect of the invention is a method for detecting a movement of an object relative to the sensor of a vehicle. The method comprises the step of providing a sensor with an antenna device comprising a substrate on which an antenna element and a reflector are located. In addition, the substrate has a main extension plane extending along a horizontal direction and a lateral direction. Furthermore, a vertical direction extends perpendicular to the horizontal direction and the lateral direction and, thus, perpendicular to the main extension plane of the substrate. In addition, the method comprises the step of emitting electromagnetic waves from the antenna element of the sensor. Furthermore, the method comprises the step of reflecting the electromagnetic waves emitted from the antenna element by the reflector of the sensor, thereby narrowing in the vertical direction the electromagnetic waves emitted by the antenna element and also spatially widening in the horizontal direction the electromagnetic waves emitted by the antenna element. Furthermore, the system comprises the step of reflecting electromagnetic waves, which were reflected by the object, at the reflector of the sensor towards the antenna element. In addition, the method comprises the step of receiving the electromagnetic waves reflected at the reflector by the antenna element of the sensor. In addition, the method comprises the step of detecting based on the electromagnetic waves received by the antenna element a movement of the object relative to the sensor of the vehicle.

The advantage of this embodiment is that, with the method, the effectiveness of a sensor can be improved with the help of a specific geometry respectively form of the reflector of the sensor. Thereby, a decrease of misdetection and misinterpretations of motions can be achieved, which might trigger functions of the vehicle, which are not needed by the user. In particular, a movement detection in a specific corridor relative to the vehicle can be improved with the method, because the spatial narrowing of the reflector in the vertical direction and the spatial widening in the horizontal direction can be adjusted to the specific corridor in relation to the vehicle, which should be supervised. Therefore, the detection accuracy can be increased.

In other words, a sensor is provided which comprises and/or consists of an antenna element and a reflector which are both located on a substrate of the sensor. In relation to the surface of the substrate, the horizontal and lateral directions are defined. Perpendicular to the horizontal and lateral direction, a vertical direction is provided which is also perpendicular to the main extension plane and/or the surface of the substrate. The method comprises the step of emitting and/or generating electromagnetic waves from the antenna element of the sensor. The method comprises the step of reflecting respectively deflecting the electromagnetic waves by the reflector of the antenna element of the sensor, thereby modifying and/or altering the electromagnetic waves to have a more spatially narrowed field of view in the vertical direction and also a spatially widened and/or broad field of view of the reflector along the horizontal direction. Furthermore, the method comprises the step of reflecting and/or deflecting electromagnetic waves with the reflector, which have been reflected by an object. Furthermore, the method can comprise the step of receiving, respectively gathering the electromagnetic waves, which are reflected by the reflector towards the antenna elements. In addition, the method can comprise the step of detecting, supervising and/or finding a movement of an object relative to the sensor of the vehicle based on the electromagnetic waves, which have been received by the antenna element.

Another aspect of the invention is the use of an antenna device for movement detection as described before and hereinafter.

All disclosures as described herein in relation to any aspect of the invention apply equally to all other aspects of the invention. In the following, the examples and embodiments of the invention are described with reference to the figures.

DETAILED DESCRIPTION OF EMBODIMENTS

FIG. 1 shows an antenna device 100 comprising an antenna element 102 for emitting and receiving electromagnetic waves, as e.g. radar signals. Furthermore, the antenna device 100 comprises a reflector 104 for reflecting the electromagnetic waves emitted from the antenna element 102. In addition, the antenna device 100 comprises a substrate 106 on which the antenna element 102 and the reflector 104 are positioned. In particular, the antenna element 102 and the reflector 104 are attached to a surface 120 of the substrate 106. In addition, the substrate 106 has a main extension plane 108 extending along a horizontal direction Y and a lateral direction X. In addition, a vertical direction Z extends perpendicular to the horizontal direction Y and the lateral direction X and, thus, perpendicular to the main extension plane 108 of the substrate 106. In other words, the vertical direction Z is oriented perpendicular to the surface 120 of the substrate 106.

Furthermore, the reflector 104 is configured for spatially narrowing in the vertical direction Z the electromagnetic waves emitted by the antenna element 102. Additionally, the reflector 104 is configured for spatially widening in the horizontal direction Y the electromagnetic waves emitted by the antenna element 102.

The advantage of this embodiment is that, with the specific geometry respectively form/shape of the reflector 104, the electromagnetic waves, which are emitted by the antenna element 102, are reflected by the reflector 104 in a narrower but at the same time wider corridor. Thus, the reflector 104 allows an improved adjustment/adaptation of the corridor through which the emitted electromagnetic waves are spread. Thereby, a more accurate detection of objects can be achieved with the reflector 104. This is in particular helpful, when the antenna device 100 is used for an automotive sensor for detecting a movement in a specific corridor relative to the vehicle 300, because the spatial narrowing in the vertical direction Z and the spatial widening in the horizontal direction Y achieved by the reflector 104, can be adjusted to the specific corridor in relation to the vehicle 300, which should be supervised. Therefore, the detection accuracy can be increased. Furthermore, it can be beneficial that the reflector 104 can be mounted by soldering to the substrate 106 of the antenna device 100, thereby reducing external noise, which may result from a potential gap between the reflector 104 and the substrate 106.

As can be seen in FIG. 1, the antenna device 100 comprises a substrate 106, which can be a PCB or the like. An antenna element 102 is located on a surface 120 of the substrate 106. The horizontal direction Y and the lateral direction X are both directions lying on the surface 120 of the substrate 106 and are located perpendicular to each other within the plane of the surface 120. Furthermore, a reflector 104 is located on the surface 120 of the substrate 106. In addition, the vertical direction Z extends perpendicular to the horizontal direction Y and the lateral direction X. In other words, the vertical direction Z is orientated perpendicular to the surface 120 of the substrate 106. In particular, the reflector 104 is configured for spatially narrowing in the vertical direction Z the electromagnetic waves, which can be emitted by the antenna element 102. Furthermore, the reflector 104 is configured for spatially widening in the horizontal direction Y the electromagnetic waves emitted by the antenna element 102. This can be achieved with the help of the convex 110 and concave 112 form of the reflector as will be explained in view of FIGS. 2 and 3.

FIG. 2 shows the reflector 104. The reflector 104, as can be seen in FIG. 2, comprises a concave and/or parabolic shape 112 which is configured for spatially narrowing in the vertical direction Z the electromagnetic waves emitted by the antenna element 102. This is achieved by the concave and parabolic shape 112 of the reflector 104 in the vertical direction Z. The concave and/or parabolic shape 112 can be described via a cross section of the reflector 104. The cross section is defined along the lateral direction X and the vertical direction Z through the reflector 104. Thus, the cross section is located in an XZ-plane in FIG. 2. A focal point 114 (see FIG. 5) of the parabolic shape 112 of the reflector 104 is directed towards the antenna element 102, which is not illustrated in FIG. 2. Thus, with regard to FIG. 2, the focal point would be positioned on the left side of the reflector 104. With the help of the concave and/or parabolic shape 112 of the reflector 104, the electromagnetic waves emitted by the antenna element 102 are spatially narrowed. In other words, due to the concave and/or parabolic shape 112 of the reflector 104, the spread of the electromagnetic waves is spatially narrowed in the vertical direction Z. Thereby, a specific area can be defined in dependency of the concave and/or parabolic shape 112 to which the electromagnetic waves are focused with the reflector 104. As can be seen in FIG. 2, the reflector 104 is bent around the axis of the horizontal direction Y. This leads to the concave and/or parabolic shape 112 of the reflector 104 with regard to the antenna element 102. As has been explained hereinbefore, it should be noted that, in the context of the present disclosure, the term "parabolic shape" or "parabola" shall be understood as that the reflector 104 extends in the vertical direction Z along one side of the symmetry line of the corresponding full parabola, which is commonly used be the person skilled in the art. Thus, the reflector 104 has a curvature in the vertical direction Z, which is the same as one side of the symmetry line of the corresponding full parabola. An embodiment of a reflector 104 with such a parabolic shape 112 is shown in FIG. 2.

As can be seen in FIG. 3, the reflector 104 has a convex shape 110, in the horizontal direction Y, for widening the electromagnetic waves emitted by the antenna element 102. The reflector 104 in FIG. 3 is shown from a perspective, which is below the substrate of set-up shown in FIG. 1, but without showing the substrate illustrated in FIG. 1. The convex shape 110 can be described by a cross section through the reflector 104 along the axis of the horizontal direction Y and the lateral direction X. In other words, the cross section is located in an XY-plane in FIG. 3. As can be seen in FIG. 3, the reflector 104 is bent around the vertical direction Z, such that the convex shape 110 of the reflector is directed towards the antenna element 102. In particular, the curvature degree of the convex shape 110 can be adapted to the area, which should be supervised with the help of a sensor 200. The reflector 104, of FIG. 3 has substantially a U-shape that can be defined by an opening angle of the convex shape between 0° and 90°. Said opening angle shall be understood in the context of the present disclosure as the angle between the X-axis as shown in FIG. 3 and the surface at a backside of the reflector 104, the backside being the side of the reflector 104 that faces away from the antenna element as e.g. shown in FIG. 1 with sign 102. Thus, in case, the opening angle would be 0°, the upper and lower part of the surface of the backside of the reflector 104 shown in FIG. 3 above and below the X-axis would be closed, i.e. would be adjacently aligned. In case, the opening angle would be 90°, the back surface of the reflector 104 would be a straight plane, oriented substantially perpendicular to the axis of the horizontal direction X in FIG. 3.

Figure 4:
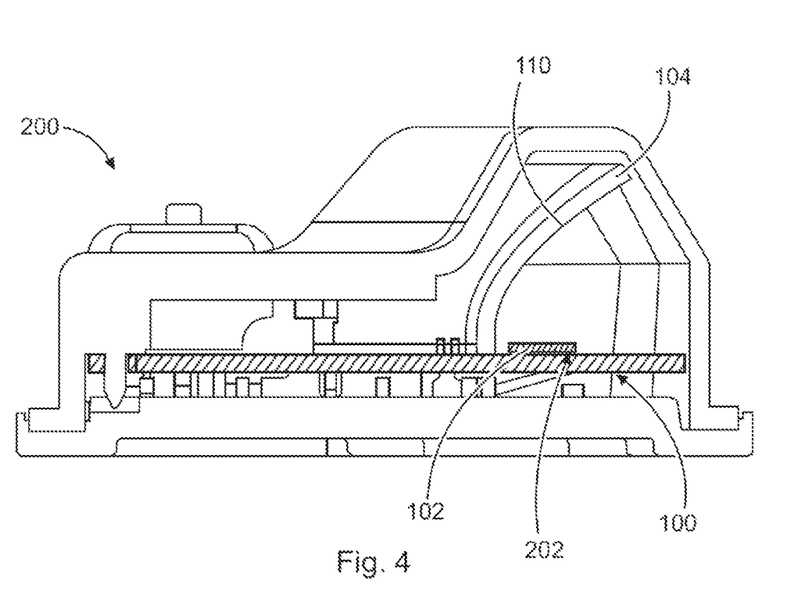
FIG. 4 shows an automotive sensor according to an embodiment of the present invention.

FIG. 4 shows an embodiment of an automotive sensor 200. The automotive sensor 200 comprises a detection unit 202, which is configured for detecting a movement of an object based on the electromagnetic waves emitted and received by the antenna element 102. The antenna device 100 comprises a reflector 104, which is located inside the automotive sensor 200. As can be seen in FIG. 4, the reflector 104 has a concave shape 112, which causes the spatial narrowing of the electromagnetic waves emitted by the antenna element 102.

The sensor 200 further comprises a transmission circuit and a reception circuit. Although these circuits are not shown in the Figs., they are electrically connected to the antenna element 102. Furthermore, the transmission circuit is configured for outputting a transmission signal towards the antenna element 102, preferably for creating radar signals. In addition, the reception circuit is configured for detecting based on the electromagnetic waves reflected at the reflector 104 and received by the antenna element 102 a movement of the object relative to the sensor 200. The transmission circuit and the reception circuit may be formed in one piece by an integrated circuit, but in another embodiment, they may be provided as separate units. Furthermore, the antenna element 102 and the integrated circuit are preferably formed in one piece.

Figure 5:
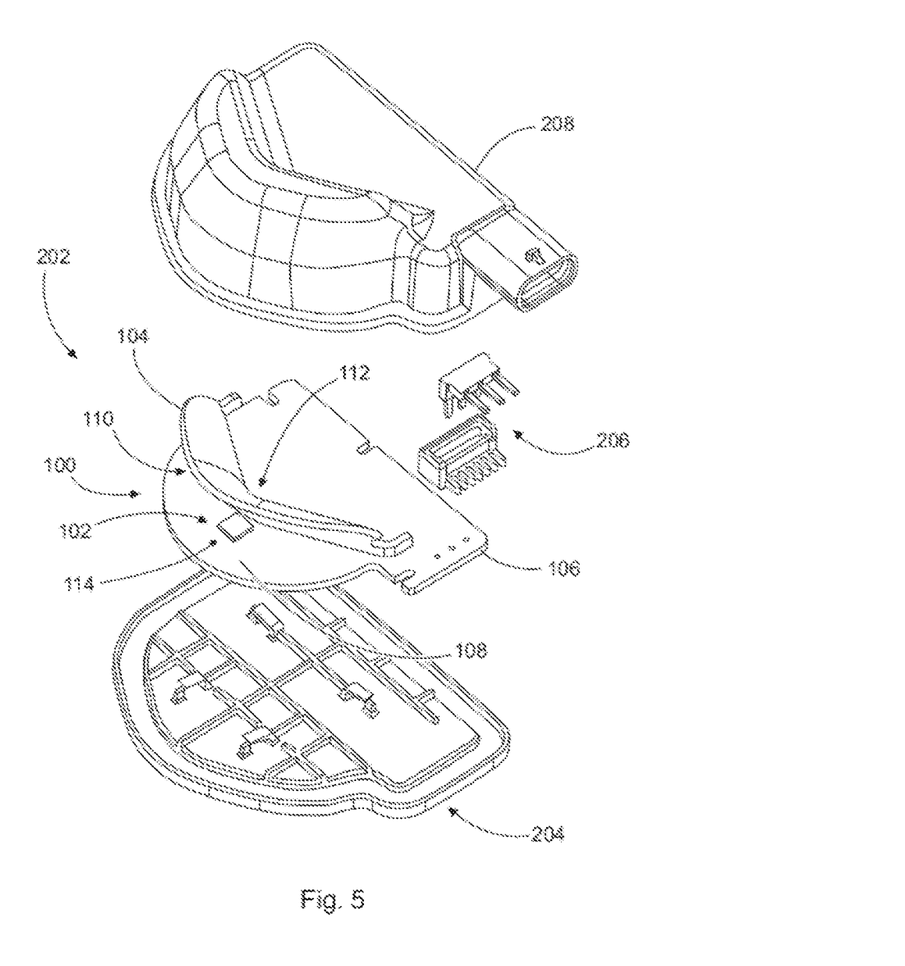
FIG. 5 shows an automotive sensor according to an embodiment of the present invention.

FIG. 5 shows the automotive sensor 200, which comprises a lid 204 and a radome 208, which forms the shell of the sensor 200. Furthermore, the sensor 200 comprises an electric connector 206, which is interconnected with the substrate 106. On the substrate 106, the antenna element 102 and the reflector 104 are located, wherein the reflector 104 at least partially protrudes over the antenna element 102 due to its concave shape 112 having the focal point 114. The reflector 104 is configured for generating a focal point 114. The reflector 104 comprises a concave shape 112 for narrowing electromagnetic waves in the vertical direction Z. In addition, the reflector 104 has a convex shape 110 in the horizontal direction in order to spatially widening the electromagnetic waves emitted by the antenna element 102. In addition, the substrate 106 comprises a main extension plane 108. The vertical direction Z is located perpendicular to the main extension plane 108.

Figure 6:
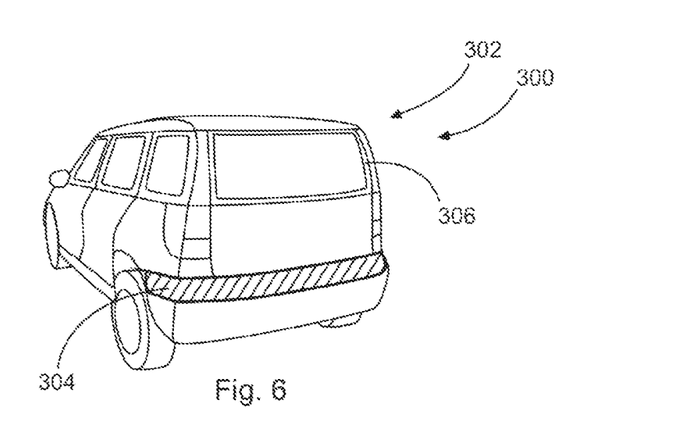
FIG. 6 shows a vehicle according to an embodiment of the present invention.

FIG. 6 shows a vehicle 300. The vehicle comprises a frunk 302. The trunk 302 comprises a lid 306, which is located above a bumper 304 of the vehicle 300. The sensor device 200 can be located inside the bumper 304. For example, the user can move his foot under the bumper 304 and the sensor device 200 can detect the movement of the user. The sensor device 200 can then trigger in combination with the vehicle 300 an opening mechanism for the lid 306. In addition, the sensor device 200 can detect a second movement, which triggers a closing mechanism for the lid 306.

Figure 7:
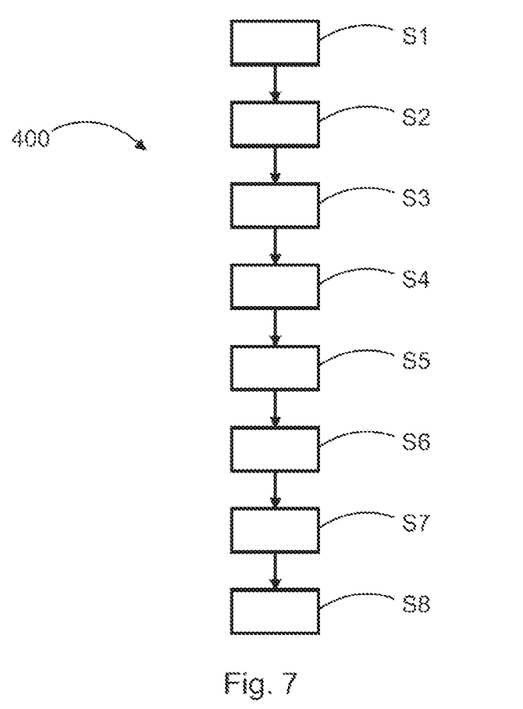
FIG. 7 shows a diagram illustrating the method according to an embodiment of the present invention.

FIG. 7 shows a flowchart illustrating the steps of a method 400 according to an embodiment. The method 400 comprises the step of S1, providing a sensor with an antenna device 100 comprising a substrate 106 on which an antenna element 102 and the reflector 104 are located. Furthermore, the method 400 comprises the step of emitting S2 electromagnetic waves from the antenna element 102. In addition, the method 400 comprises the step of reflecting S3 the electromagnetic waves emitted from the antenna element 102. Furthermore, the method 400 comprises the step of spatially narrowing S4, in the vertical direction Z, the electromagnetic waves emitted by the antenna element 102. Furthermore, the method 400 comprises the step of spatially widening S5, in the horizontal direction Y, the electromagnetic waves emitted by the antenna element 102. Furthermore, the method 400 comprises the step of reflecting S6 electromagnetic waves, which were reflected by the object at the reflector 104 of the sensor 200 towards the antenna element 102. In addition, the method 400 comprises the step of receiving S7 the electromagnetic waves. Furthermore, the method 400 comprises the step of detecting S8 a movement of the object relative to the sensor 200 of the vehicle 300.

What is claimed is:

1. An antenna device comprising:
   an antenna element configured to emit and receive electromagnetic waves;
   a reflector configured to reflect the electromagnetic waves emitted from the antenna element; and a substrate defining a main extension plane extending along a horizontal direction (Y) and a lateral direction (X), both of the reflector and the antenna element being positioned on the main extension plane of the substrate, a vertical direction (Z) extending perpendicular to the horizontal direction (Y) and the lateral direction (X), and thus perpendicular to the main extension plane of the substrate, wherein the reflector is configured to spatially narrow in the vertical direction (Z), and spatially widen in the horizontal direction (Y), the electromagnetic waves emitted by the antenna element, and wherein the reflector has a concave shape in the vertical direction (Z), thereby spatially narrowing, in the vertical direction (Z), the electromagnetic waves emitted by the antenna element upon reflection at the reflector, and the reflector has a convex shape in the horizontal direction (Y), thereby spatially widening, in the horizontal direction (Y), the electromagnetic waves emitted by the antenna element upon reflection at the reflector.

2. An automotive sensor for detecting a movement of an object, the sensor comprising:
the antenna device according to claim 1; and
a detection unit configured to detect a movement of the object based on electromagnetic waves emitted and received by the antenna element.

3. The automotive sensor according to claim 2,
wherein the concave shape of the reflector has an imaginary focal spot, which is located towards the antenna element, and
wherein the reflector due to the convex shape in the horizontal direction (Y) bends away from the antenna element in horizontal direction (Y).

4. The automotive sensor according to claim 2,
wherein the reflector has at least one of:
a parabolic shape in the vertical direction (Z) with a focal length that is selected from the range of 3 mm to 10 mm; and
an at least partially U-shape in the horizontal direction (Y), wherein the U-shape has a radius, which is selected from the range of 1 mm to 10 mm.

5. The automotive sensor according to claim 2,
wherein the antenna element is configured to emit radar signals, and to receive radar signals reflected from the object to the sensor.

6. The automotive sensor according to claim 2, further comprising:
a transmission circuit configured to output a transmission signal towards the antenna element; and
a reception circuit configured to detect, based on an electromagnetic wave reflected at the reflector and received by the antenna element, a movement of the object relative to the sensor.

7. The automotive sensor device according to claim 6,
wherein the transmission circuit and the reception circuit are formed in one piece by an integrated circuit, and wherein the antenna element and the integrated circuit are preferably formed in one piece.

8. The automotive sensor according to claim 2,
wherein the antenna element comprises:
an emitting antenna configured to emit electromagnetic waves; and a receiving antenna configured to receive electromagnetic waves reflected at the object and reflected at the reflector.

9. A vehicle with a sensor for detecting a movement of an object, the vehicle comprising:
the sensor according to claim 2.

10. The vehicle according to claim 9,
wherein the sensor is attached to the vehicle below a trunk of the vehicle and
wherein the sensor is embodied as a kick sensor and is configured to detect a movement of a user for opening a lid of the trunk of the vehicle.

11. The vehicle according to claim 9,
wherein the sensor is configured to survey an opening movement of a lid of the vehicle, and to detect if the lid undergoing the opening movement is approaching an object, thereby preventing automatic tail gate collision.

12. The vehicle according to claim 9,
wherein the sensor is attached to an interior part of the vehicle and configured to detect a movement of a user inside the vehicle.

13. A method for detecting a movement of an object relative to a sensor of a vehicle, the method comprising:
providing a sensor with an antenna device comprising a substrate on which an antenna element and a reflector are located, wherein the substrate defines a main extension plane extending along a horizontal direction (Y) and a lateral direction (X), wherein a vertical direction (Z) extends perpendicular to the horizontal direction (Y) and the lateral direction (X), and thus perpendicular to the main extension plane of the substrate;
emitting electromagnetic waves from the antenna element of the sensor;
reflecting the electromagnetic waves emitted from the antenna element by a concave shape of the reflector in the vertical direction (Z) of the sensor thereby spatially narrowing in the vertical direction (Z) the electromagnetic waves emitted by the antenna element, and by a convex shape of the reflector in the horizontal direction (Y) also spatially widening in the horizontal direction (Y) the electromagnetic waves emitted by the antenna element; and
reflecting electromagnetic waves, which were reflected by the object, at the reflector of the sensor towards the antenna element;
receiving the electromagnetic waves reflected at the reflector by the antenna element of the sensor; and
detecting, based on the electromagnetic waves received by the antenna element, a movement of the object relative to the sensor of the vehicle.

14. The antenna device according to claim 1, wherein the convex shape of the reflector in the horizontal direction (Y) is an at least partially U-shape in the horizontal direction (Y).

15. The automotive sensor according to claim 2, wherein the object is a user of a vehicle.

16. The automotive sensor according to claim 8, wherein the emitting antenna and the receiving antenna are located side by side to each other on the substrate of the sensor.

17. The vehicle according to claim 10, wherein the sensor is disposed on a bumper of the vehicle.

* * * * *